United States Patent
Stammers et al.

(10) Patent No.: US 10,708,716 B2
(45) Date of Patent: Jul. 7, 2020

(54) METHODS AND APPARATUS FOR SELECTING NETWORK RESOURCES FOR UE SESSIONS BASED ON LOCATIONS OF MULTI-ACCESS EDGE COMPUTING (MEC) RESOURCES AND APPLICATIONS

(71) Applicant: Cisco Technology, Inc., San Jose, CA (US)

(72) Inventors: Timothy Peter Stammers, Raleigh, NC (US); Robert Michael Batz, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/161,928

(22) Filed: Oct. 16, 2018

(65) Prior Publication Data
US 2020/0120446 A1     Apr. 16, 2020

(51) Int. Cl.
*H04W 4/029*     (2018.01)
*H04L 29/12*     (2006.01)
(Continued)

(52) U.S. Cl.
CPC ......... *H04W 4/029* (2018.02); *H04L 61/1511* (2013.01); *H04W 72/04* (2013.01); *H04W 76/10* (2018.02)

(58) Field of Classification Search
CPC ..... H04W 4/029; H04W 76/10; H04W 72/04; H04L 61/1511
See application file for complete search history.

(56) References Cited

U.S. PATENT DOCUMENTS 7,447,162 B1    11/2008 Leung et al.
8,780,796 B1     7/2014 Ballal et al.
(Continued)

FOREIGN PATENT DOCUMENTS

EP    3386264 A1    10/2018
FR    3051307 A1    11/2017

OTHER PUBLICATIONS

OpenDNS, Inc., "A Faster Internet", The Global Internet Speedup, http://www.afasterinternet.com/howitworks.htm, downloaded Mar. 29, 2019, 2 pages.
(Continued)

*Primary Examiner* — Duc C Ho

(57) ABSTRACT

In one illustrative example, a mobility node (e.g. an SMF) may receive a message which indicates a request for creating a session for a user equipment (UE). A user plane function (UPF) instance for the session may be selected based on a set of parameters. The set of parameters may include one or more location(s) of one or more multi-access edge computing (MEC) resources and applications of interest for the UE. Location data associated with the MEC resources and applications may be determined from server addresses obtained from UPF processing of domain name server (DNS) queries associated with the applications. In preferred implementations, the server addresses are client subnet location-dependent server addresses obtained from client subnet-based DNS queries. The server addresses or location data derived therefrom may be regularly submitted to the SMF for improved UPF selection based on locations of MEC resources and applications.

20 Claims, 15 Drawing Sheets

(51) Int. Cl.
*H04W 76/10* (2018.01)
*H04W 72/04* (2009.01)

(56) References Cited

U.S. PATENT DOCUMENTS

| | | | |
|---|---|---|---|
| 10,064,120 B2 | 8/2018 | Olsson et al. | |
| 2017/0366618 A1* | 12/2017 | Vrzic | H04L 67/141 |
| 2018/0109590 A1* | 4/2018 | Rao | H04W 4/029 |
| 2018/0270896 A1 | 9/2018 | Faccin et al. | |
| 2019/0261260 A1* | 8/2019 | Dao | H04W 36/0009 |
| 2019/0319858 A1* | 10/2019 | Das | H04L 5/0041 |

OTHER PUBLICATIONS

MECSware GmbH., "Real-Time Mobile Edge Cloud", downloaded Mar. 29, 2019, 3 pages.

Michael Till Beck et al., "Mobile Edge Computing: A Taxonomy", AFIN 2014: The Sixth International Conference on Advances in Future Internet, Copyright (c) !ARIA, 2014, ISBN: 978-1-61208-377-3, http://citeseerx.ist.psu.edu/viewdoc/download?doi=10.11.670.9418&rep=rep1&type=pdf, Jan. 2014, 7 pages.

Cisco, "Cisco Ultra 5G Packet Core Solution", Oct. 5, 2018, pp. 1-11.

C. Contavalli et al., "Client Subnet in DNS Queries", Internet Engineering Task Force (IETF), RFC 7871- Informational, May 2016, pp. 1-30.

Sami Kekki et al., :MEC in 5G Networks, ETSI White Paper No. 28, Jun. 2018, pp. 1-28.

International Search Report and Written Opinion in counterpart International Application No. PCT/US2019/055303, dated Dec. 18, 2019, 21 pages.

ETSI, "Multi-access Edge Computing (MEC); Phase 2: Use Cases and Requirements", ETSI GS MEC 002 V2.1.1, Oct. 2018, https://www.etsi.org/deliver/etsi_gs/MEC/001_099/002/02.01.01_60/gs_MEC002v020101p.pdf, 66 pages.

Nowoswiat, David, "Why do you need a 5G cloud-native core?", Nokia Blog, Jul. 7, 2018, 8 pages. retrieved from Internet Feb. 2, 2020;https://www.nokia.com/blog/why-do-you-need-5g-cloud-native-core/.

Brown, Gabriel et al., "Service-Oriented 5G Core Networks", Heavy Reading, Feb. 2017, 10 pages.

Basilier, Henrik et al., "A vision of the 5G core: flexibility for new business opportunities", Ericsson Technology Review, Feb. 2, 2016, 8 pages.

* cited by examiner

| MEC SELECTION TABLE 1000A | | | |
|---|---|---|---|
| Apps_Profile (Input) 1004 | UE_Location (Input) 1006 | MEC (Output) 1008 | Description Info 1010 |
| Sales_Cisco | 1000_Block_Main_St | MEC_Downtown | Access to Sales force, etc |
| Sales_Cisco | 2nd_Avenue | MEC_West Side | Access to Sales force, etc |
| Marketing_Cisco | 2nd_Avenue | MEC_North Side | Access to Rally, Forecasting App, etc |

*FIG. 10A*

UPF AND IP POOL SELECTION TABLE 1000B

| MEC (Input) | UE_Location (Input) | UPF (Output) | IP Pool (Output) |
|---|---|---|---|
| MEC_Downtown | 1000_Block_Main_St | MEC_Downtown | 10.10.200.0 / 24 |
| MEC_West Side | 2nd_Avenue | UPF_North Shore | 10.10.100.0 / 24 |
| MEC_North Side | 2nd_Avenue | UPF_North Shore | 10.10.101.0 / 24 |

METHODS AND APPARATUS FOR SELECTING NETWORK RESOURCES FOR UE SESSIONS BASED ON LOCATIONS OF MULTI-ACCESS EDGE COMPUTING (MEC) RESOURCES AND APPLICATIONS

TECHNICAL FIELD

The present disclosure relates generally to mobile networks and multi-access edge computing (MEC), and more particularly to methods and apparatus for use in selecting (e.g. mobile) network resources for user equipment (UE) sessions based on locations of MEC resources and applications of interest.

BACKGROUND

It would be desirable to provide a more efficient and optimal selection of (e.g. mobile) network resources for UE sessions in a multi-access edge computing (MEC) environment, especially suitable for use in a 5G mobile network.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 10A is a table which is an example of an MEC selection table according to some implementations of the present disclosure; and FIG. 10B is a table which is an example of UPF and IP pool selection table according to some implementations of the present disclosure.

Figure 1A:
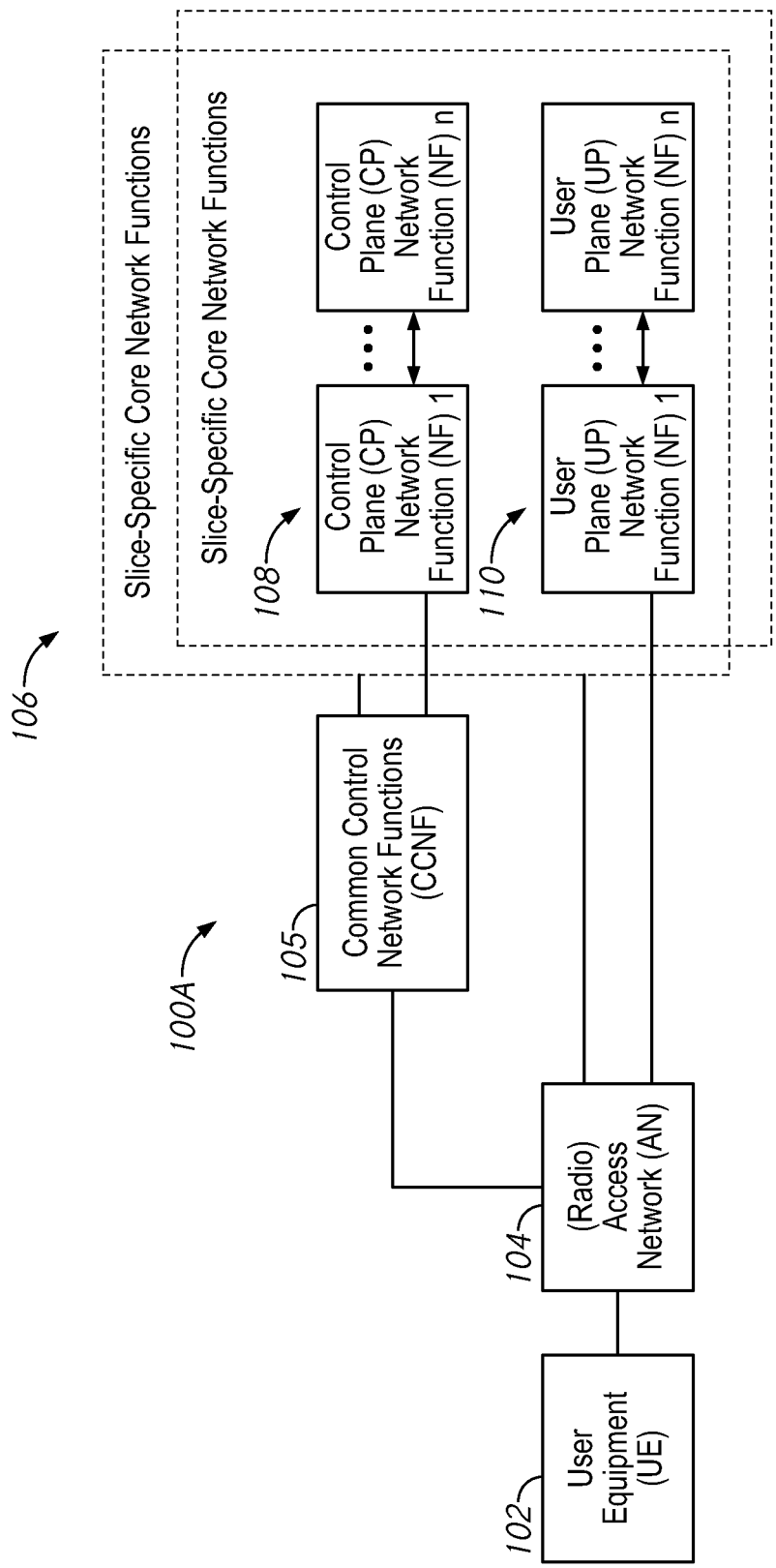
FIG. 1A is an illustrative representation of a basic network architecture of a Fifth Generation (5G) mobile network.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Methods and apparatus for use in selecting (e.g. mobile) network resources for user equipment (UE) sessions based on location of multi-access edge computing (MEC) resources and applications of interest are described herein.

In one illustrative example, a mobility node (e.g. a session management function or "SMF") may receive a message which indicates a request for creating a session for a UE. A user plane function (UPF) instance for the session may be selected based on a set of parameters. The set of parameters may include one or more location(s) of one or more multi-access edge computing (MEC) resources and applications of interest for the UE.

Location data associated with MEC resources and applications may be provisioned, derived, or otherwise determined from server addresses obtained from the UPF processing of domain name server (DNS) queries associated with the applications. In preferred implementations, the server addresses are client subnet location-dependent server addresses obtained from client subnet-based DNS queries. The server addresses or location data derived therefrom may be regularly submitted to the SMF for improved (e.g. optimal) UPF selection based on locations of MEC resources and applications.

More detailed and alternative techniques and implementations are provided herein as will be described below.

EXAMPLE EMBODIMENTS

As described in the Background section, it would be desirable to provide a more efficient and optimal selection of (e.g. mobile) network resources for user equipment (UE) sessions in a multi-access edge computing (MEC) environment, especially suitable for use in a 5G mobile network.

FIG. 1A is an illustrative representation of a network architecture 100A of a 5G mobile network configured to facilitate communications for a UE 102. In general, network architecture 100a includes common control network functions (CCNF) 105 and a plurality of slice-specific core network functions 106. UE 102 may obtain access to the mobile network via an access network (AN) 104, which may be a radio access network (RAN). In the present disclosure, the UEs operating in the 5G mobile network may be any suitable type of devices, such as cellular telephones, smart phones, tablet devices, Internet of Things (IoT) devices, and machine-to-machine (M2M) communication devices, to name but a few.

CCNF 105 includes a plurality of network functions (NFs) which commonly support all sessions for UE 102. UE 102 may be connected to and served by a single CCNF 105 at a time, although multiple sessions of UE 102 may be served by different slice-specific core network functions 106. CCNF 105 may include, for example, an access and mobility management function (AMF) and a network slice selection function (NSSF). UE-level mobility management, authentication, and network slice instance selection are examples of common functionalities provided by CCNF 105.

Slice-specific core network functions of network slices 106 are separated into control plane (CP) NFs 108 and user plane (UP) NFs 110. In general, the user plane carries user traffic while the control plane carries network signaling. CP NFs 108 are shown in FIG. 1A as CP NF 1 through CP NF n, and UP NFs 110 are shown in FIG. 1A as UP NF 1 through UP NF n. CP NFs 108 may include, for example, a session management function (SMF), whereas UP NFs 110 may include, for example, a user plane function (UPF).

Figure 1B:
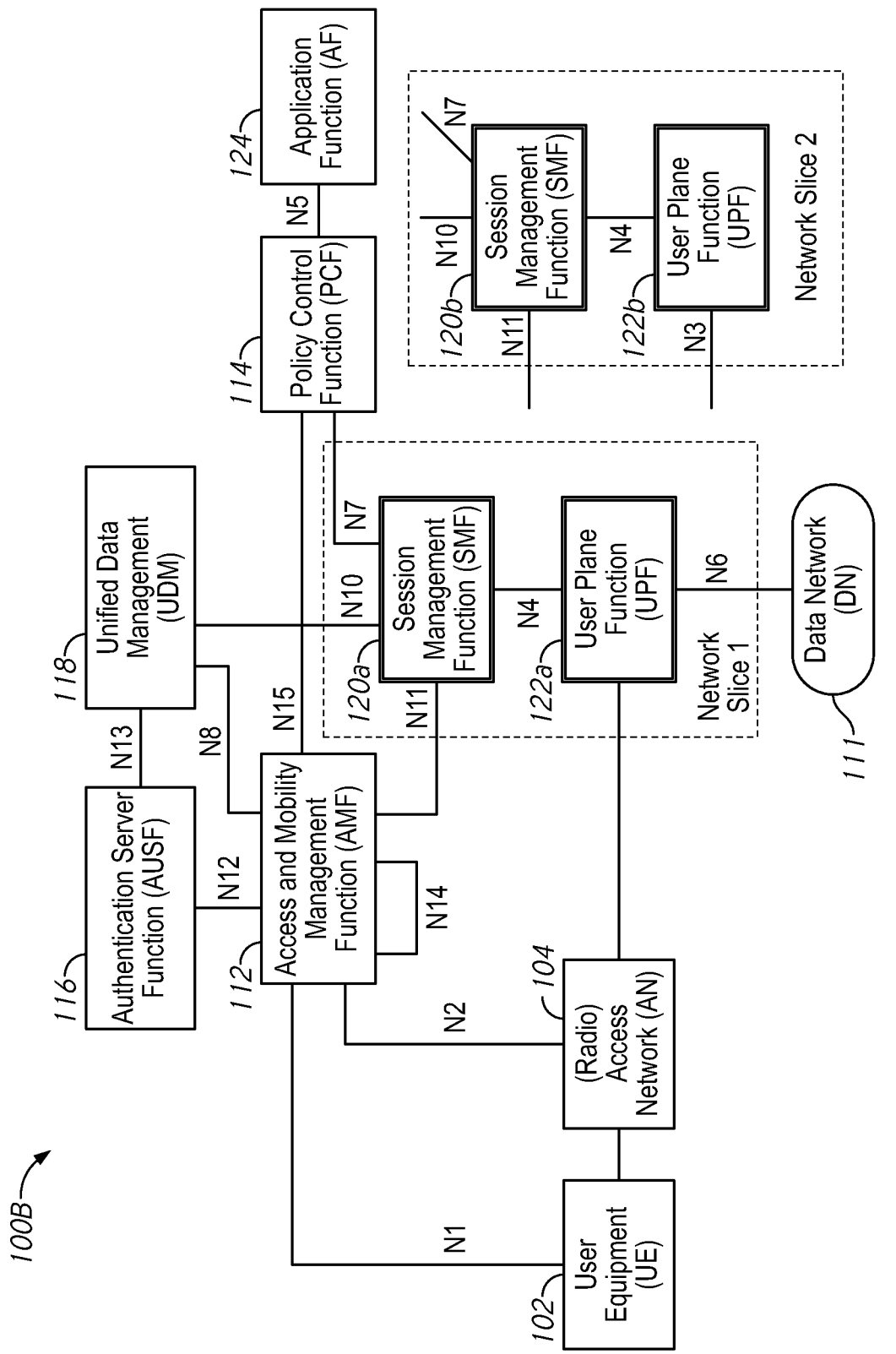
FIG. 1B is an illustrative representation of a more detailed network architecture of the mobile network of FIG. 1A.

FIG. 1B is an illustrative representation of a more detailed network architecture 100B of the 5G mobile network of FIG. 1A. As provided in 3GPP standards for 5G (e.g. 3GPP 23.501 and 23.502), network architecture 100b for the 5G mobile network may include an authentication server function (AUSF) 116, a unified data management (UDM) 118 (having a unified data repository or UDR), an AMF 112, a policy control function (PCF) 114, an SMF 120a, and a UPF 122a. A plurality of interfaces or reference points N1 through N15 shown in FIG. 1B may define the communications and/or protocols between each of the entities, as described in the relevant (evolving) standards documents. One or more application functions, such as an application function (AF) 124, may connect to the 5G mobile network via PCF 114. One or more data networks (DN) 111 having application servers (AS) may be connected to the 5G mobile network through UPFs such as UPF 122a.

UPF 122a is part of the user plane and all other NFs (i.e. AMF 112, SMF 120a, PCF 114, AUSF 116, and UDM 118) are part of the control plane. Separation of user and control planes guarantees that each plane resource can be scaled independently. It also allows UPFs to be deployed separately from CP functions in a distributed fashion. The NFs in the CP are modularized functions; for example, AMF and SMF are independent functions allowing for independent evolution and scaling. As specifically illustrated in FIG. 1B, NFs such as SMF 120a and UPF 122a of FIG. 1B may be provided as specific instances in a first network slice (e.g. network slice 1). Additional instances of NFs for additional network slices may be provided as well, as illustrated by SMF 120b and UPF 122b provided as additional specific instances in a second network slice (e.g. network slice 2).

Figure 1C:
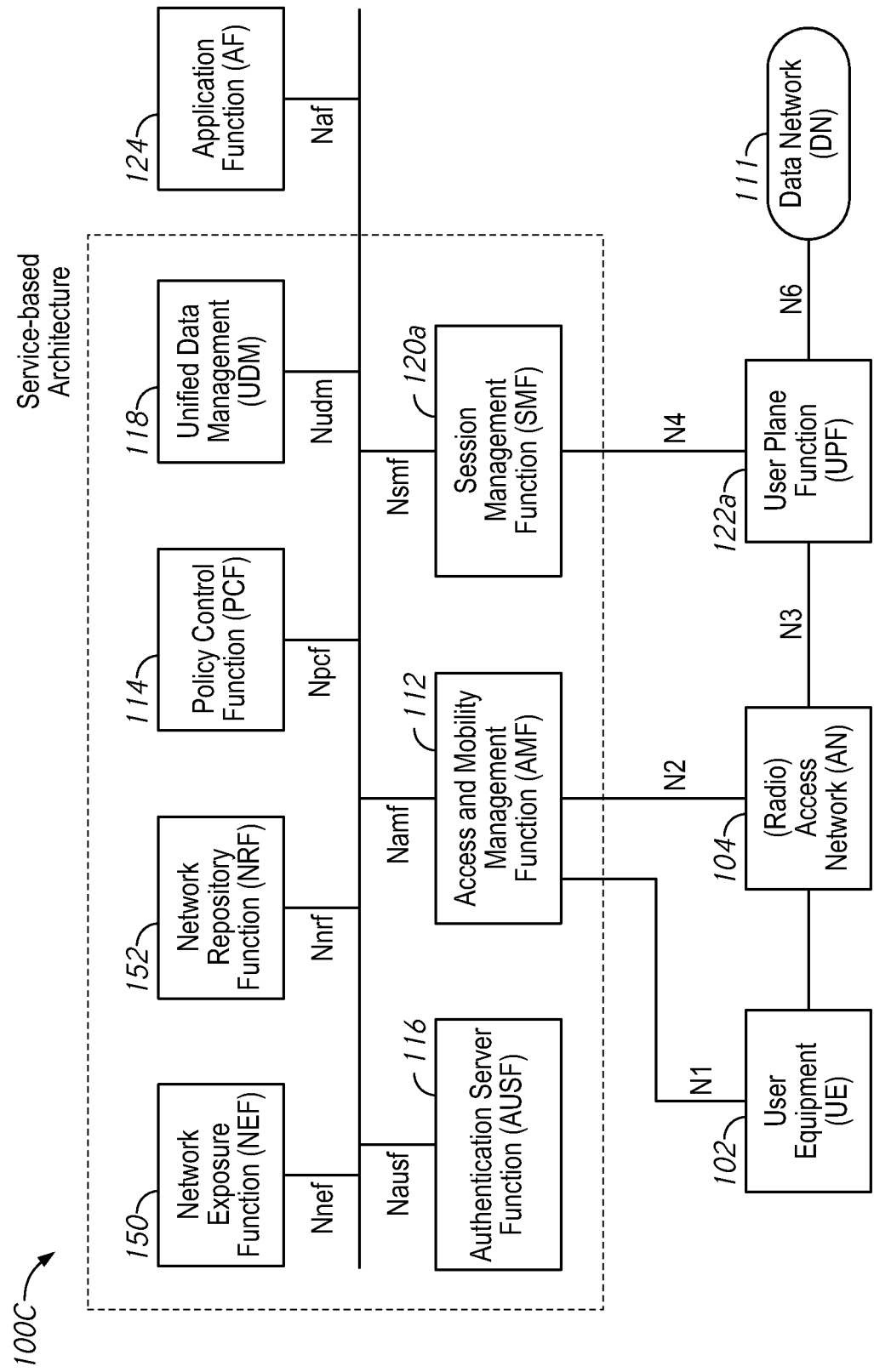
FIG. 1C is an illustrative representation of the mobile network of FIGS. 1A-1B as a service-based architecture.

In FIG. 1C, a service-based architecture 100C of the 5G mobile network of FIGS. 1A-1B is illustrated. Network node functions in the service-based architecture 100C of FIG. 1C, not shown in FIGS. 1A-1B, include a network exposure function (NEF) entity 150 and an NF repository function (NRF) 152. A plurality of interfaces N1 through N6, as well as interfaces $N_{nef}$, $N_{nrf}$, $N_{pcf}$, $N_{udm}$, $N_{ausf}$, $N_{amf}$, $N_{smf}$, and Naf, may define the communications and/or protocols between each of the entities, as described in the relevant (evolving) standards.

Mobile-edge computing, now referred to as multi-access edge computing (MEC), may be understood to be a cloud-based service environment provided at the "edge" of the network, bringing real-time, high-bandwidth, low-latency access to information. One goal of MEC is to reduce network congestion and improve application performance by performing task processes closer to the user. MEC aims to improve the delivery of content and applications to those users. MEC use cases realized today include Augmented Reality (AR) and Virtual Reality (VR); connected car, which also thrives in high-bandwidth, low-latency, highly-available settings; and various Internet of Things (IoT) applications that rely on high performance and smart utilization of network resources.

Large public venues and enterprise organizations are amongst the beneficiaries of MEC. In large-scale situations where localized venue service are important, content is delivered to onsite consumers from a MEC server located at the venue. The content is locally-stored, processed, and delivered, without requiring a backhaul or centralized core network. Large enterprises are increasingly motivated to process users locally, rather than backhaul traffic to a central network, e.g. with use of small cell networks.

5G networks operating according to 3GPP 5G specifications are a future target environment for MEC deployments. MEC is acknowledged as one of the key pillars for meeting the demanding Key Performance Indicators (KPIs) of 5G, especially as far as low latency and bandwidth efficiency are concerned. ETSI ISG MEC (Industry Specification Group for Multi-access Edge Computing) is the home of technical standards for edge computing; this group has already published a set of specifications associated with MEC.

The design approach taken by 3GPP allows the mapping of MEC onto Application Functions (AF) that can use the services and information offered by other 3GPP network functions based on the configured policies. In addition, a number of enabling functionalities were defined to provide flexible support for different deployments of MEC and to support MEC in case of user mobility events. The new 5G architecture is described and explained in more detail in the next clause.

Figure 2:
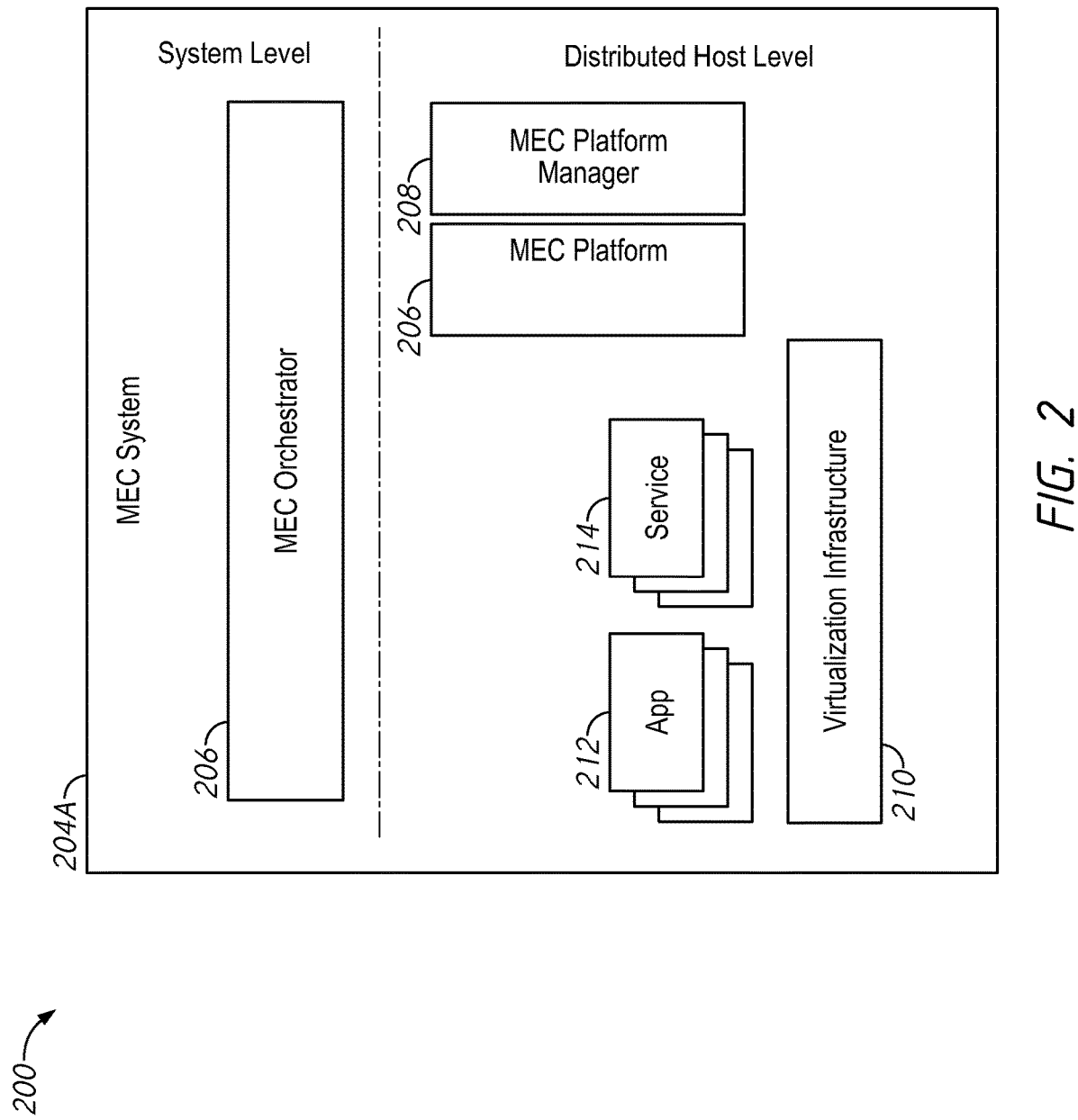
FIG. 2 is an illustrative representation of a generic multi-access edge computing (MEC) system architecture for use in the mobile network of FIGS. 1A-1C.

FIG. 2 is an illustrative representation of a generic MEC system architecture 200 of an MEC system 204A for use in a 5G mobile network (e.g. the mobile network of FIGS. 1A-1C). Architecture 200 may include, at the system level, an MEC orchestrator 206 and, at the distributed host level, an MEC platform 206, an MEC platform manager 208, a virtualization infrastructure 210, a plurality of applications 212, and a plurality of services 214.

Architecture 200 of the MEC system illustrated in FIG. 2 may be provided for the 5G network environment of FIGS. 1A-1C, where some of the functional entities of MEC interact with NFs of the 5G core network. Discussion of 5G entities (e.g. FIGS. 1A-1C) in relation to MEC entities will now follow.

NFs and associated services produced in a 5G network are registered with the NRF, while services produced by applications are registered in a service registry of the MEC platform 206. Service registration is part of an application enablement functionality. To use a service, a network function may directly interact with an NF that produces the service. A list of available services may be discovered from the NRF. Some of the services may be accessible only via the NEF, which is also available to untrusted entities that are external to the domain, for accessing the service. In other words, the NEF acts as a centralized point for service exposure and also has a role in authorizing access requests originating from outside of the system.

As described earlier, one of the key concepts in 5G is "network slicing." Network slicing allows the allocation of the required features and resources from the available network functions to different services or to tenants that are using the services. A Network Slice Selection Function (NSSF) of the 5G mobile network is a function that assists in the selection of suitable network slice instances for users, as well as the allocation of an AMF. An MEC application (i.e. an application hosted in a distributed cloud of an MEC system) can belong to one or more network slices that have been configured in the 5G core network.

The UDM is responsible for many services related to users and subscriptions. It generates the 3GPP AKA authentication credentials, handles user identification related information, manages access authorization (e.g. roaming restrictions), registers the user serving NFs (serving AMF, SMF), supports service continuity by keeping record of SMF/Data Network Name (DNN) assignments, supports Lawful Interception (LI) procedures in outbound roaming by acting as a contact point and performs subscription management procedures.

Policies and rules in the 5G system may be handled by the PCF. The PCF is also the function that services an AF (e.g. an MEC platform). The PCF may be accessed either directly or indirectly via the NEF, depending whether the AF is considered trusted or not; in the case of traffic steering, is may depend on whether the corresponding PDU session is known at the time of the request.

Figure 3:
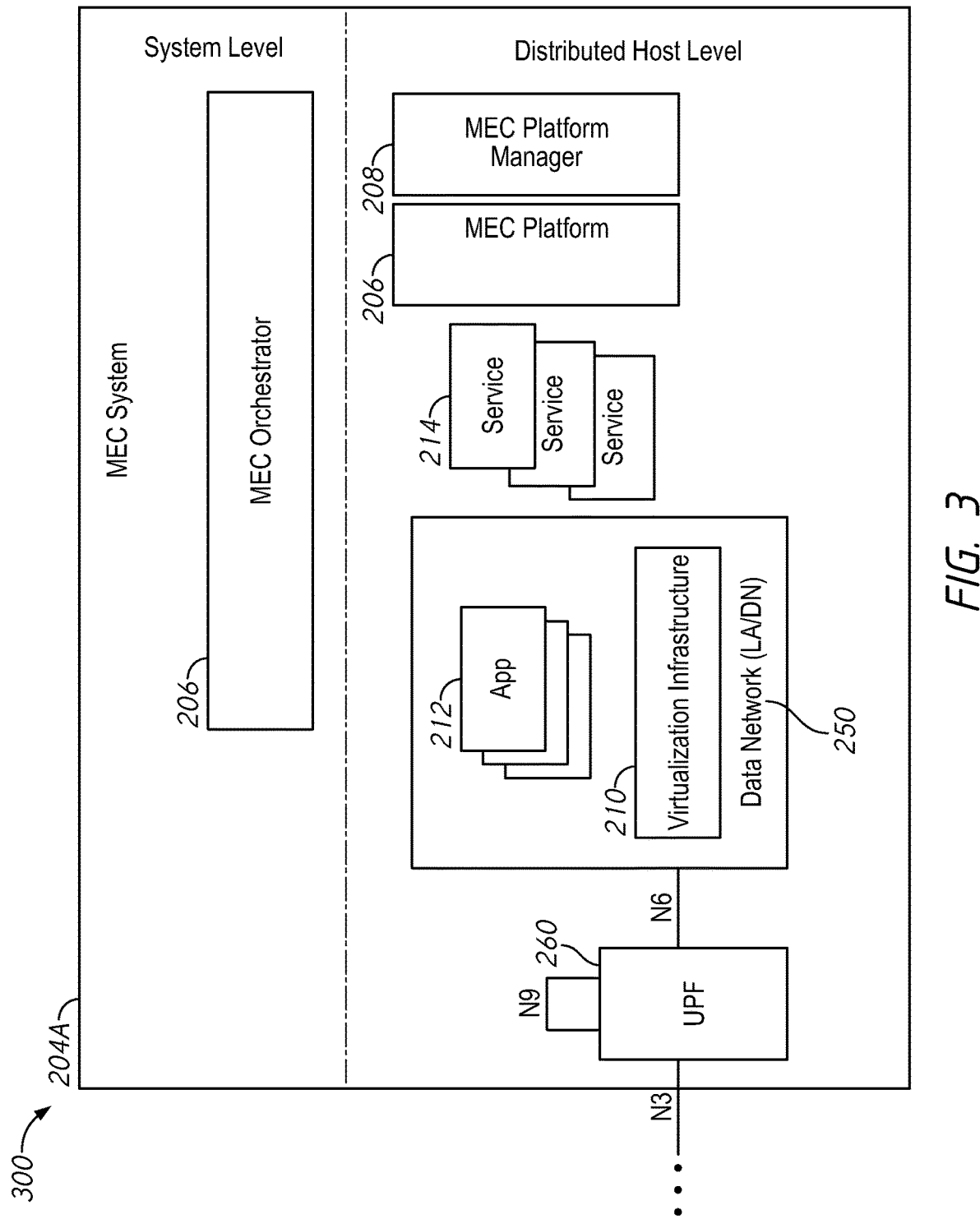
FIG. 3 is an illustrative representation of an MEC system architecture of an integrated MEC deployment with the mobile network of FIGS. 1A-1C.

The UPF has a key role in an integrated MEC deployment in a 5G network. UPFs may be seen as a distributed and configurable data plane from the MEC system perspective. Thus, in some deployments, the local UPF may be part of the MEC implementation. To better illustrate, FIG. 3 shows how MEC system 204A may be deployed in an integrated manner in a 5G network. More specifically, what is shown in FIG. 3 is an illustrative representation of an MEC system architecture 300 of an integrated MEC deployment with a 5G network (e.g. the mobile network of FIGS. 1A-1C).

As shown in FIG. 3, the MEC system 204A may be deployed on the N6 reference point of a UPF 260, i.e. in a data network 250 external to the 5G system. This is enabled by the flexibility in locating a UPF. MEC orchestrator 206 may be configured to operate as an AF in the 5G network and interact with an NEF; in some cases, it may directly interact with target 5G NFs. On the MEC host level, MEC platform 206 is configured to interact with 5G NFs, again in the role of an AF. The MEC host, i.e. the host level functional entities, are most often deployed in a data network in the 5G system. While the NEF as a core network function is a system level entity deployed centrally together with similar NFs, an instance of NEF may also be deployed in the edge to allow low latency, high throughput service access from an MEC host.

Managing user mobility is a central function in a mobile communications system. In a 5G system, it is the AMF that handles mobility related procedures. In addition, the AMF is responsible for the termination of RAN control plane and Non-Access Stratum (NAS) procedures, protecting the integrity of signaling, management of registrations, connections and reachability, interfacing with the LI function for access and mobility events, providing authentication and authorization for the access layer, and hosting Security Anchor Functionality (SEAF). With the SBA, the AMF provides communication and reachability services for other NFs and it also allows subscriptions to receive notifications regarding mobility events.

Some of the functionality provided by the SMF may include session management, IP address allocation and management, DHCP services, selection/re-selection and control of the UPF, configuring the traffic rules for the UPF, LI for session management events, charging and support for roaming. As MEC services may be offered in both centralized and edge clouds, for example, the SMF may play a significant role due to its role in selecting and controlling the UPF. The SMF exposes service operations to allow MEC as a 5G AF to manage PDU sessions, control policy settings and traffic rules, and subscribe to notifications on session management events.

Logically, MEC hosts are deployed in the edge or central data network. The UPF may handle the steering of user plane traffic towards the targeted MEC applications in the data network. The locations of the data networks and the UPF are a choice of the network operator, and the network operator may choose to place the physical computing resources based on technical and business parameters such as available site facilities, supported applications and their requirements, measured or estimated user load etc. In some implementations, the MEC management system, orchestrating the operation of MEC hosts and applications, may be configured to determine dynamically where to deploy the MEC applications.

Figure 4:
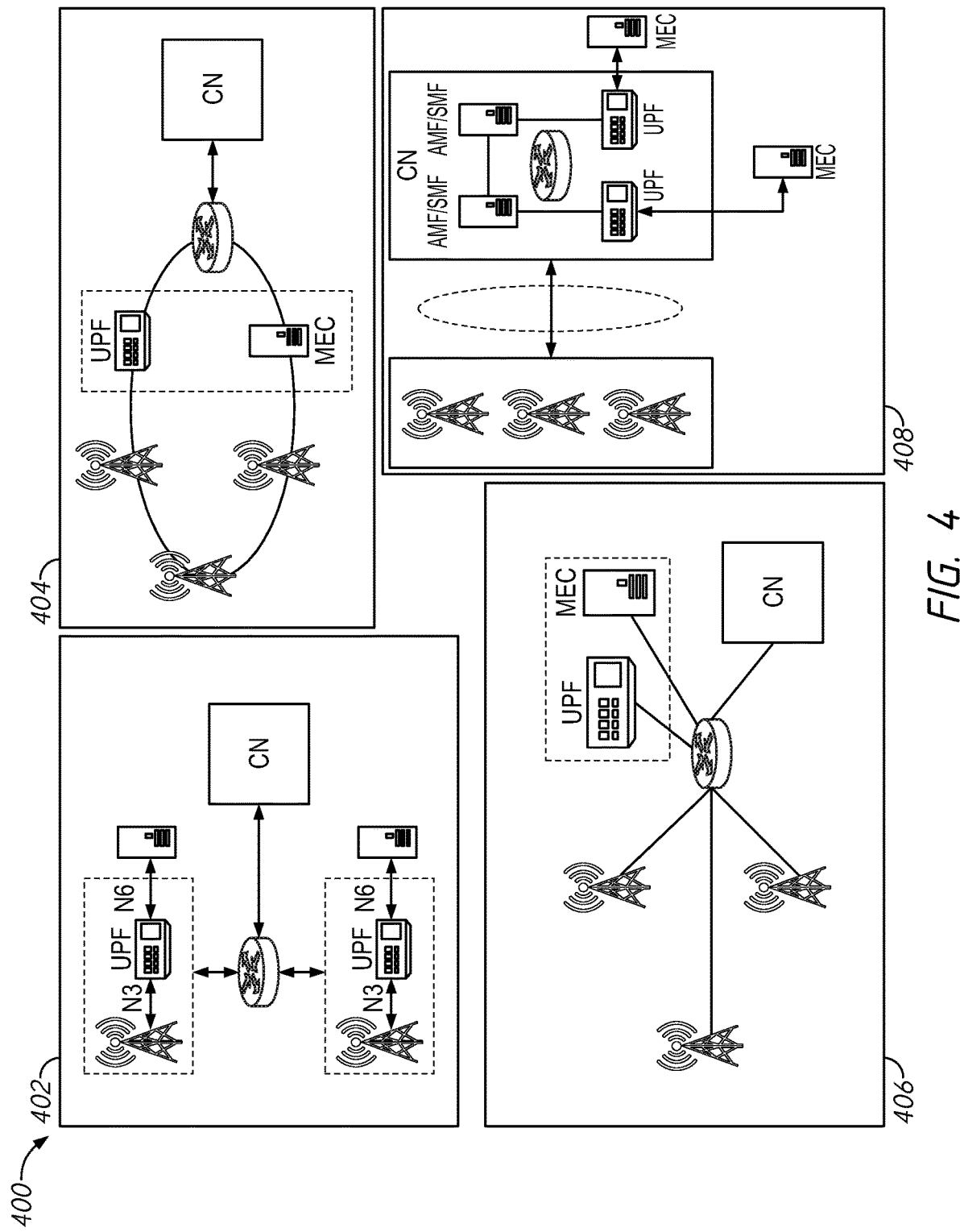
FIG. 4 is an illustrative representation of network node arrangements of some options for the physical location of the MEC and associated applications.

In terms of physical deployment of MEC hosts, there are different options available based on various operational, performance and/or security related requirements. To better illustrate, FIG. 4 is an illustrative representation of network node arrangements 400 of some options for the physical location of the MEC and associated applications. In a node arrangement 402, the MEC and the local UPF may be collocated with the base station. In a node arrangement 404, the MEC may be collocated with a transmission node, possibly with a local UPF. In a node arrangement 406, the MEC and the local UPF may be collocated with a network aggregation point. In a node arrangement 408, the MEC may be collocated with Core Network (CN) functions (i.e. in the same data center). Other node arrangements may be realized as one skilled in the art would readily appreciate.

As is apparent, the physical deployment options indicate that MEC may be flexibly deployed in different locations, from near the base station to closer to the central data network. Common to most or all deployments is the UPF that is deployed and used to steer the traffic towards targeted MEC applications and towards the network.

Again, an MEC system combines the environments of networking and computing at the edge of the network to optimize the performance for ultra-low latency and high bandwidth services. A direct consequence of hosting the applications at the edge, however, is the exposure of those applications to UE mobility. The UEs are indeed expected to be mobile, and their movements may render the location of the currently-used edge application non-optimal in the long run, even though the underlying network maintained the service continuity between the endpoints. For the MEC system to maintain the application requirements in a mobile environment, application mobility may be most desirable (if not necessary). In practice, this means that the application instance that is serving the user may be changed to a new location.

Thus, application mobility is another feature of the MEC system. Here, it may be necessary to be able to relocate a user's context and/or application instance from one MEC host to another to continue offering an optimized service experience for the user. Application mobility is a part of service continuity support, in which the service to the UE will resume once the user's context and/or application instance has been relocated to another MEC host.

Figure 5:
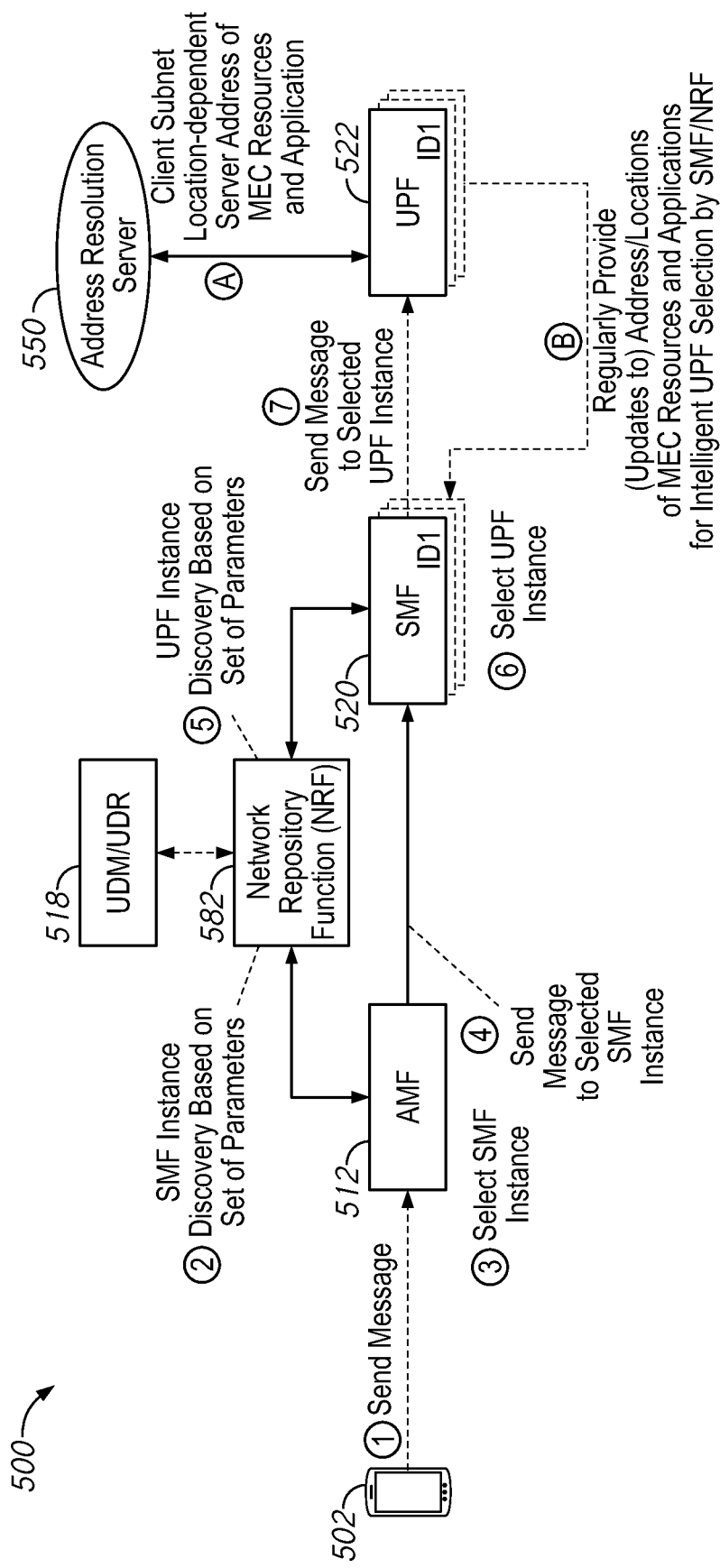
FIG. 5 is a flow diagram for describing a general method of selecting NF instances or nodes in the mobile network (e.g. SMF and UPF selection) for use in creating and/or establishing a session for a UE, according to some implementations of the present disclosure.

Shifting gears back to 5G network functionality, what is shown in FIG. 5 is a flow diagram 500 for describing a method of selecting NF instances or nodes in the mobile network (e.g. SMF and UPF selection) for use in creating and/or establishing a session for a UE, according to some implementations of the present disclosure.

The method of FIG. 5 may be performed at one or more mobility nodes, such as one or more NF or NRF nodes (e.g. an AMF, SMF, and/or NRF, e.g., as described). The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

In FIG. 5, a UE 502 may send a message to the network for service. Here, an AMF 512 may receive a message which indicates a session establishment request for establishing a PDU session for the UE (step 1 of FIG. 5). In response, the AMF 512 may consult with an NRF 582 for discovery of one or more SMF instances that may be appropriate for use in the session (step 2 of FIG. 5). An SMF instance may be selected for use in the session for the UE (step 3 of FIG. 5). The discovery and/or selection of the SMF instance may be based on a set of parameters, where at least some data items are obtained from a UDM/UDR 518. Then, the AMF 712 may send a message to the selected SMF (step 4 of FIG. 5). The selected SMF may receive the message from the AMF. The message may indicate a create session request for creating a PDU session for the UE. In response, the SMF may consult with the NRF for discovery of one or more UPF instances that may be appropriate for use in the session (step 5 of FIG. 5). A UPF instance may be selected for use in the session for the UE (step 6 of FIG. 5). The discovery and/or selection of the UPF instance may be based on a set of parameters, where at least some data items are obtained from a UDM/UDR 518.

As indicated earlier, it would be desirable to provide a more efficient and optimal selection of network resources for UE sessions in MEC environment. For MEC, this would provide even lower latency and bandwidth efficiency.

Accordingly, the selection of the UPF instance in step 6 of FIG. 5 may be based on a set of parameters which include one or more locations of one or more MEC resources and applications of interest for UE 502. A location of an application of interest may be derived or determined from a server address obtained from an application server obtained from an address resolution server 550 (e.g. a DNS server).

In preferred implementations, the server address may be a client subnet location-dependent server address for the application server. Here, a DNS request may be submitted to address resolution server 550 with a client subnet of the client (e.g. the UE) for obtaining the client subnet location-dependent server address. See steps A and B of FIG. 5. The subnet or truncated address of the client may be used to make a more informed determination by the address resolution server 550 for the selection of a more (or most) optimal (e.g. the closest) application server. In preferred implementations, the DNS query processing may be performed in accordance with RFC 7871, "Client Subnet in DNS Queries," an Extension Mechanism for DNS option (see e.g. www.afasterinternet.com).

Figure 6:
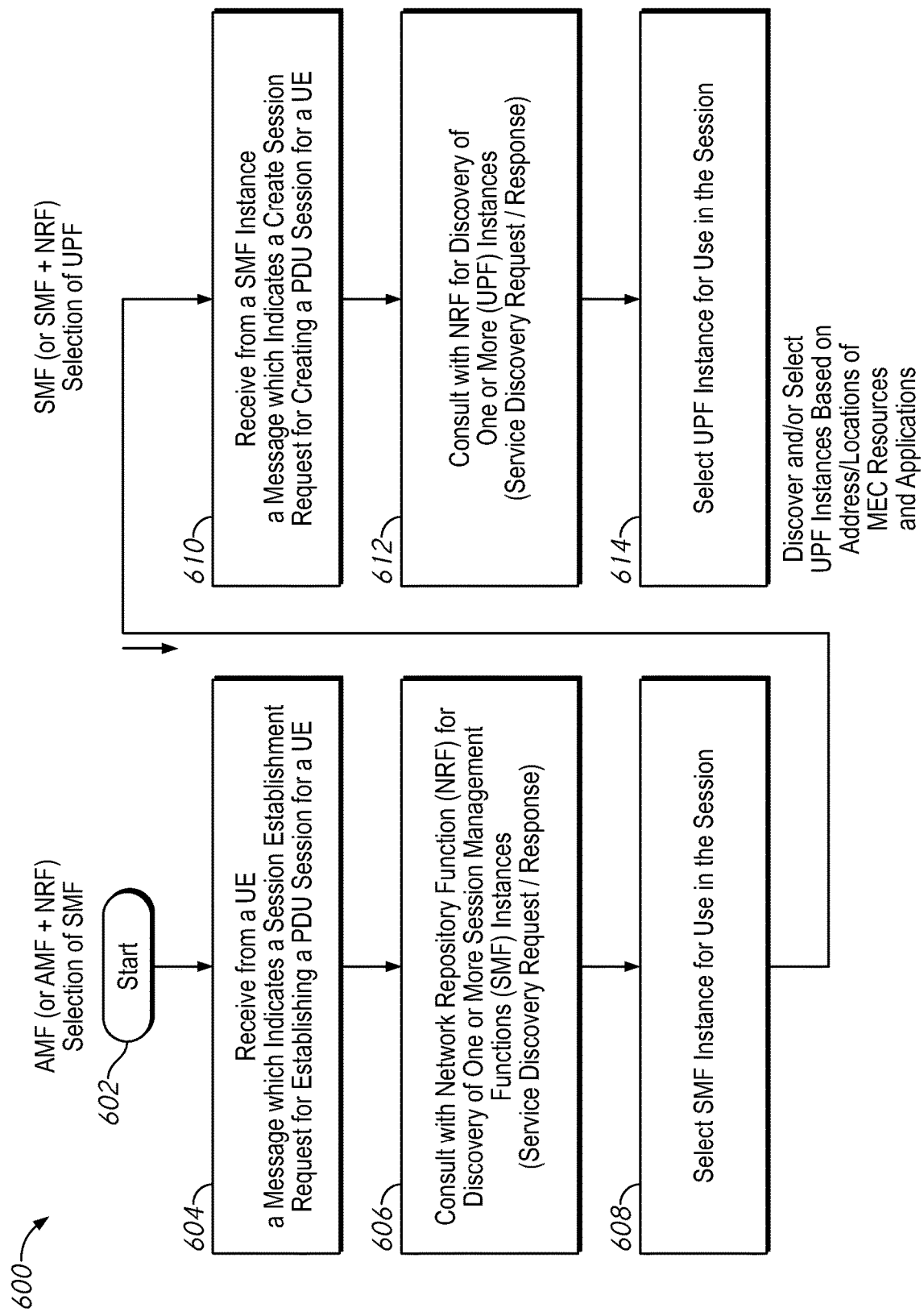
FIG. 6 is a flowchart representation of the flow diagram of FIG. 5.

FIG. 6 is a flowchart 600 for describing a method of selecting NF instances or nodes in the mobile network (e.g. SMF and UPF selection) for creating and/or establishing a session for a UE according to some implementations of the present disclosure. The method of FIG. 6 may be viewed as a flowchart representation of the flow of FIG. 5. Beginning at a start block 602 of FIG. 6, an AMF may receive a message which indicates a session establishment request for establishing a PDU session for a UE (step 604 of FIG. 6). In response, the AMF may consult with an NRF for discovery of one or more SMF instances that may be appropriate for use in the session (step 606 of FIG. 6). An SMF instance may be selected for use in the session for the UE (step 608 of FIG. 6). The one or more SMF instances may be discovered and/or selected based on at least one service, application, or subscription requirement obtained according to the request.

Once the SMF is identified, the AMF may send a message to the selected SMF. The SMF may receive the message from the AMF (step 610 of FIG. 6). The message may indicate a create session request for creating a PDU session for the UE. In response, the SMF may consult with the NRF for discovery of one or more UPF instances that may be appropriate for use in the session (step 612 of FIG. 6). A UPF instance may be selected for use in the session for the UE (step 614 of FIG. 6). The UPF instance has an assigned or associated pool of IP addresses. The one or more UPF instances may be discovered and/or selected based on at least one service, application, or subscription requirement obtained according to the request. Notably, the selection of the UPF instance may be based on one or more locations of one or more MEC resources and applications of interest for UE 502. Here, as described in relation to FIG. 5, a location of an application server for an application of interest may be derived or determined from a server address obtained from an address resolution server in a client subnet-based DNS query, where the server address is a client subnet location-dependent server address.

Figures 7A, 7B:
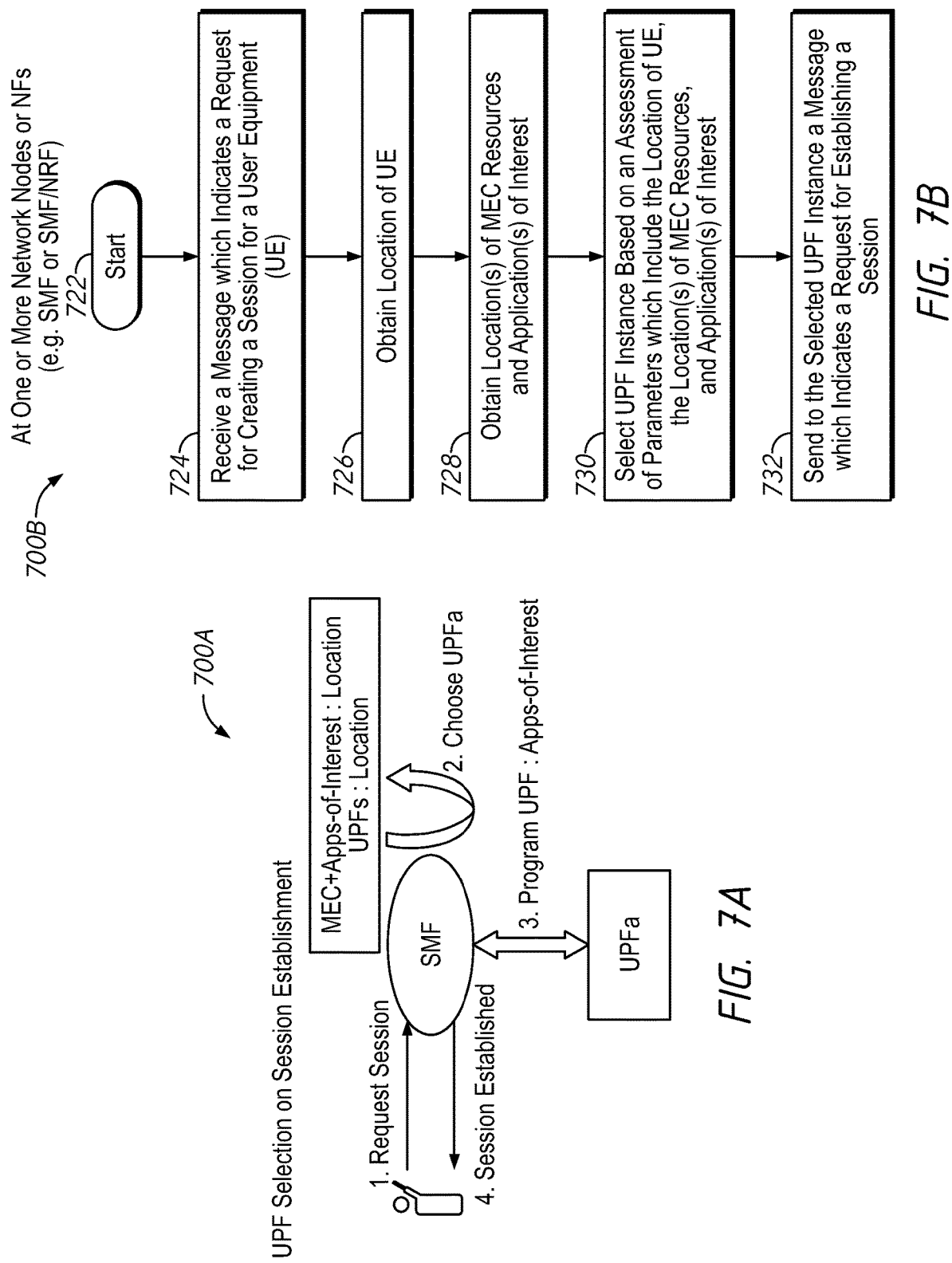
FIG. 7A is a flow diagram for describing a method of selecting a UPF instance for a UE session based on location of MEC resources and applications of interest according to some implementations of the present disclosure.
FIG. 7B is a flowchart which may be viewed as a flowchart representation of the method of FIG. 7A.

FIG. 7A is a flow diagram 700A for describing a method of selecting a UPF instance based on MEC and applications of interest according to some implementations of the present disclosure. FIG. 7B is a flowchart 700B which may be viewed as a flowchart representation of the method of FIG. 7A. The method of FIGS. 7A-7B may be performed at one or more mobility nodes, such as one or more NF or NRF nodes (e.g. an SMF and/or NRF). The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

The method in the flowchart 700B of FIG. 7B will be described together with the flow diagram 700A of FIG. 7A. Beginning at a start block 722 of FIG. 7B, the mobility node (e.g. SMF) may receive a message which indicates a request for creating a session for a UE (step 724 of FIG. 7B; step 1 of FIG. 7A). A location of the UE may be obtained (step 726 of FIG. 7B). In addition, locations of MEC resources and applications of interest may be obtained (step 728 of FIG. 7B). A UPF instance may then be selected based on a set of parameters which include the location of UE and the locations of MEC resources and applications of interest (step 730 of FIG. 7B; step 2 of FIG. 7A). A pool of IP addresses may be assigned to or associated with the selected UPF instance. A message which indicates a request for establishing a session may be sent to the selected UPF instance (step 732 of FIG. 7B). Here, the selected UPF instance may be programmed or configured with information, including information for use of the applications of interest (step 3 of FIG. 7A). An acknowledgement of the session establishment may be sent to the UE (step of FIG. 7A).

Again, in at least some implementations of step 728 of FIG. 7B (and step 2 of FIG. 7A), a location of an application of interest may be derived or otherwise determined from an application server address which is a client subnet location-dependent server address that is received in response to a client subnet-based DNS query made by a UPF on behalf of a UE.

In some implementations, an initial (e.g. limited) set or list of applications for the UE may be considered in the selection of a UPF instance with its assigned pool of IP addresses. This initial information may be known or pre-configured in the network, for example, known or pre-configured at and for use by the SMF. For example, the set of applications of interest may be limited to those applications that are locally configured for the UE. As another example, the set of applications of interest may be limited to those that are applications in actual or frequency use (e.g. as tallied by the UE or UPF). As yet another example, the set of applications of interest may be limited to those that are learned or identified from a top-10 or top-100 website list (i.e. a set or subset thereof). As even another example, the set of applications of interest may be limited to those applications of application service providers (ASPs) that a service provider (SP) has a relationship with or alternatively SP-managed applications. Any suitable combination of these examples may also be implemented.

In at least some additional implementations of step 728 of FIG. 7B (step 2 of FIG. 7A), location data of the location(s) of the application(s) of interest may be (regularly) obtained by the SMF from updates from UPF instances associated with the SMF. As UPF instances are configured to facilitate the processing of DNS requests for clients for their use of applications at application servers, the UPF instances may cache this information according to time-to-live (TTL) settings, and regularly provide or submit such information to the SMF (e.g. for a more suitable or optimal UPF selection).

Figure 7C:
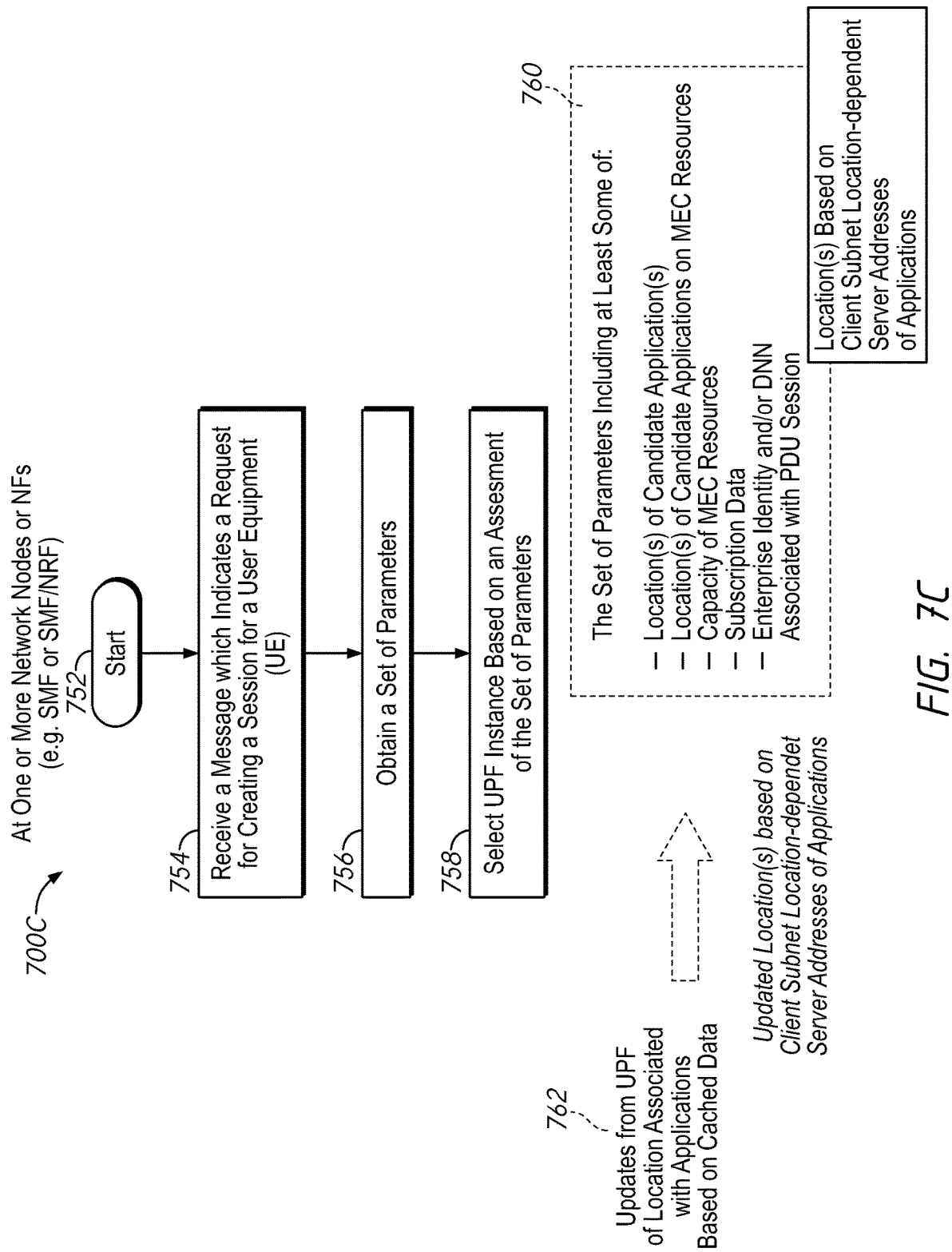
FIG. 7C is a flowchart for describing a method of selecting a UPF instance for a UE session based on location of MEC resources and applications of interest according to some implementations of the present disclosure.

FIG. 7C is a flowchart for describing a method of selecting a UPF instance based on MEC and applications of interest according to some implementations of the present disclosure. The method of FIG. 7C is similar to the method of FIG. 7B, where it is described that a more varied set of parameters may be used in the UPF selection decision. Beginning at a start block 752 of FIG. 7C, the mobility node (e.g. SMF) may receive a message which indicates a request for creating a session for a UE (step 754 of FIG. 7C). A set of parameters may be obtained (step 756 of FIG. 5C). A UPF instance may then be selected based on the set of parameters (step 758 of FIG. 7C).

In preferred implementations, the set of parameters may include at least some of the following data items (information box 760 of FIG. 7C): (a) location(s) of candidate application(s); (b) location(s) of candidate applications on MEC resources; (c) capacity of MEC resources; (d) subscription data associated with the UE; (e) an enterprise identity associated with a PDU session; and (f) a DNN associated with a PDU session. Here again, a location of an application server address for an application of interest may be based on or determined from a server address which may be a client subnet location-dependent server address. Also, location data of the location(s) of the application(s) of interest may be (regularly) obtained by the SMF with updates from UPF instances associated with the SMF (step 762 of FIG. 7C). As UPF instances are configured to facilitate the processing of DNS requests for clients for their use of applications at application servers, the UPF instances may cache this information according to TTL settings and regularly submit such information to the SMF for a more optimal UPF selection (as previously and elsewhere described herein).

Figures 8A, 8B:
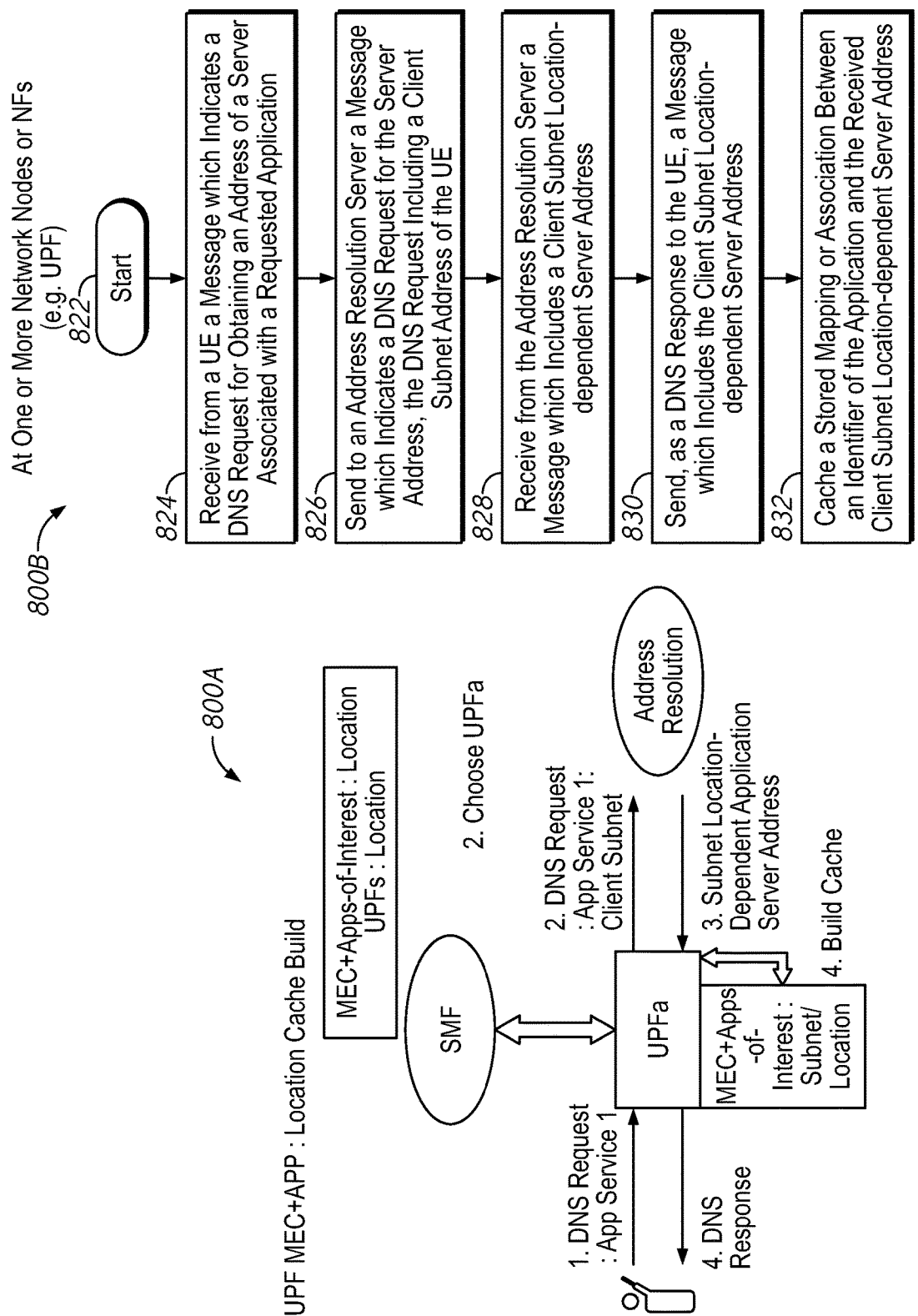
FIG. 8A is a flow diagram for describing a method of processing domain name service (DNS) requests from UEs according to some implementations of the present disclosure.
FIG. 8B is a flowchart which may be viewed as a flowchart representation of the method of FIG. 8A.

FIG. 8A is a flow diagram 800A for describing a method of processing DNS requests according to some implementations of the present disclosure. FIG. 8B is a flowchart 800B which may be viewed as a flowchart representation of the method of FIG. 8A. The method of FIGS. 8A-8B may be performed at one or more mobility nodes, such as one or more NF nodes (e.g. a UPF, or a UPF plus an address resolution server). The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

The method in the flowchart 800B of FIG. 8B will be described together with the flow diagram 800A of FIG. 8A. Beginning at a start block 822 of FIG. 8B, the mobility node (e.g. UPF) may receive from a UE a message which indicates a DNS request for obtaining an address of a server associated with a requested application (step 824 of FIG. 8B; step 1 of FIG. 8A). A message which indicates a DNS request for the server address may be sent to an address resolution server, where the DNS request includes a client subnet address of the UE (step 826 of FIG. 8B; step 2 of FIG. 8A). A message which includes a server address may be received from the address resolution server, and this server address may be a client subnet location-dependent server address (step 828 of FIG. 8B; step 3 of FIG. 8A). A message which includes the client subnet location-dependent server address may be sent to the UE as a DNS response (step 830 of FIG. 8B; step 4 of FIG. 8A). A stored mapping or association between an identifier of the application and the received client subnet location-dependent server address may be cached in memory (e.g. at the UPF instance) (step 832 of FIG. 8B; step 5 of FIG. 8A). The cached data may be stored according to TTL settings. Where the steps of the method are repeated for different requests and applications, the cache may be built with a plurality of such stored mappings or associations.

In some implementations, location data of the location associated with the application which is based on or determined from the server address (e.g. the stored mapping or association) may be submitted to the SMF, for a more optimal selection of UPF instances at the SMF.

Figure 8C:
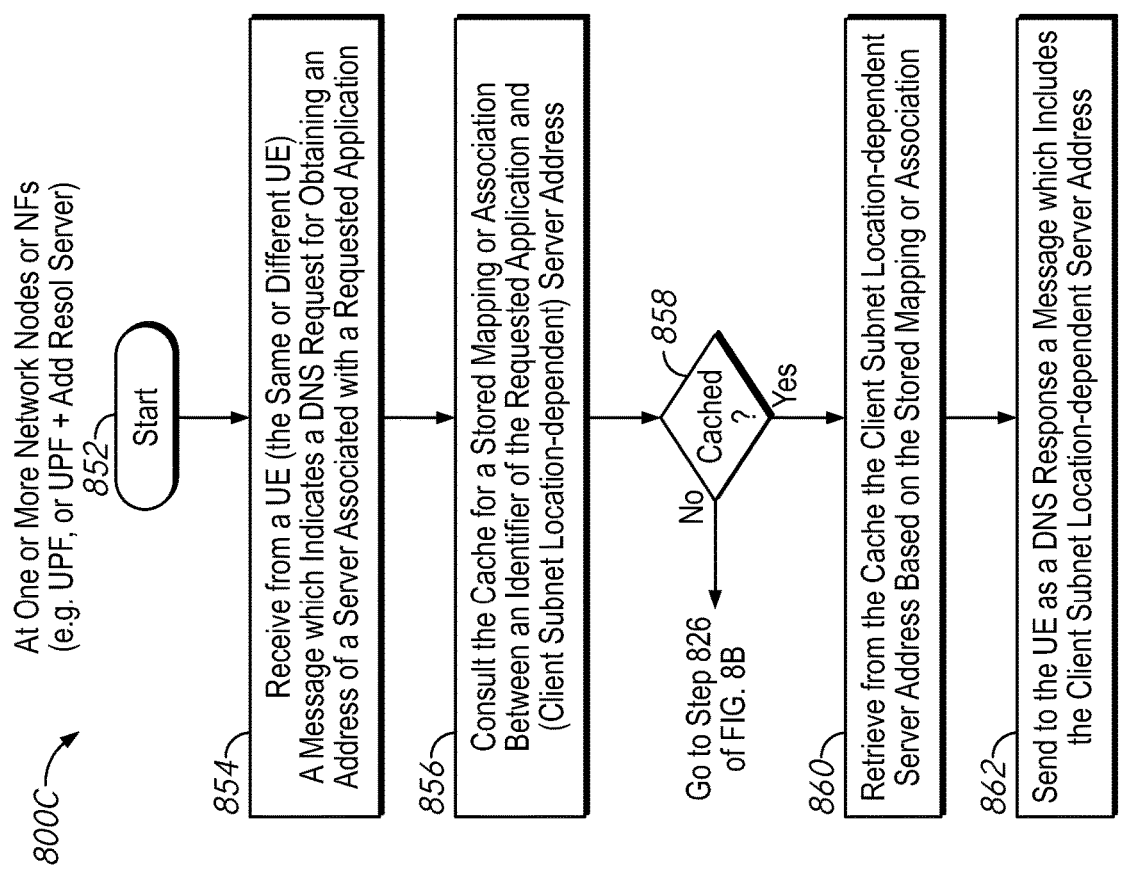
FIG. 8C is a flowchart for describing a method of processing DNS requests from UEs according to some implementations of the present disclosure.

The cached data which are stored according to TTL settings in step 832 may be utilized by the UPF instance for a more efficient processing of subsequent DNS requests from the same or different UEs. FIG. 8C is a flowchart 300C for describing a method of processing DNS requests according to some implementations of the present disclosure. The method of FIG. 8C may follow the method of FIG. 8B and be performed by the same UPF. Beginning at a start block 852 of FIG. 8C, the mobility node (e.g. the UPF) may receive from a UE (the same or different UE) a message which indicates a DNS request for obtaining an address of a server associated with a requested application (step 854 of FIG. 8C). The cache may be consulted for a stored mapping or association between an identifier of the requested application and (client subnet location-dependent) server address (step 856 of FIG. 8C). If the information is not cached ("no" at step 858 of FIG. 8C), then the method may proceed back to step 826 of FIG. 8B. If the information is indeed cached ("yes" at step 858 of FIG. 8C), then the method may continue where the client subnet location-dependent server address is retrieved from the cache based on the stored mapping or association (step 860 of FIG. 8C). A message which includes the client subnet location-dependent server address may be sent to the UE as a DNS response (step 862 of FIG. 8C).

Figures 9A, 9B:
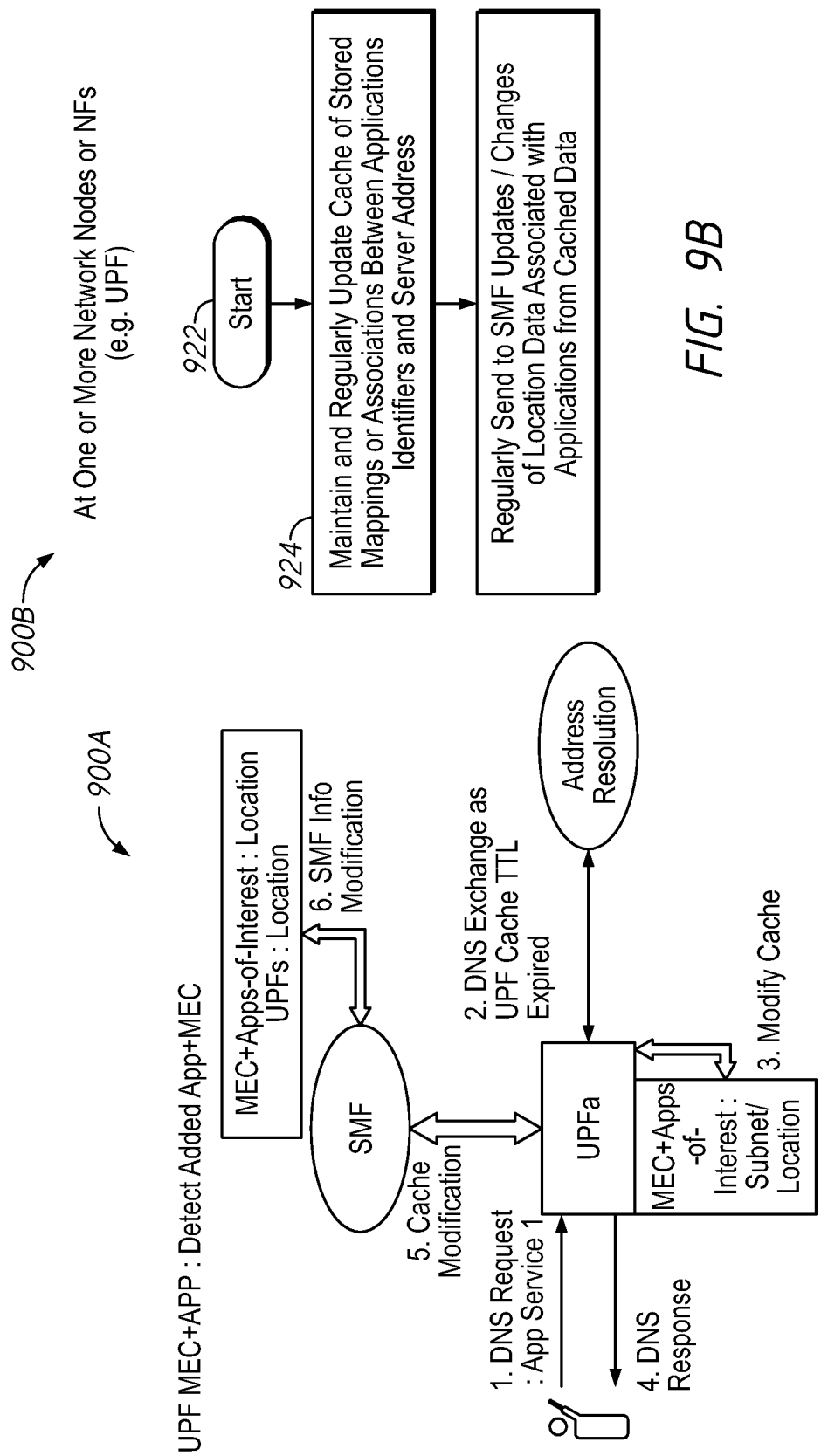
FIG. 9A is a flow diagram for describing a method of processing DNS requests and providing location data to an SMF for UPF selection according to some implementations of the present disclosure.
FIG. 9B is a flowchart which may be viewed as a flowchart representation of part of the method of FIG. 9A.

FIG. 9A is a flow diagram 900A for describing a method of processing DNS requests and providing location data to an SMF for UPF selection (i.e. based on DNS cache data of stored mappings or associations between application identities (or domain names) and client subnet location-dependent service addresses) according to some implementations of the present disclosure. Note that steps 1, 2, 3, and 4 of FIG. 9A may correspond to many processing steps of FIG. 8C already described above.

FIG. 9B is a flowchart 900B which may be viewed as a flowchart representation of part of the method of FIG. 9A. The method of FIG. 9B may be performed at one or more mobility nodes, such as one or more NF nodes (e.g. UPF, or UPF plus address resolution server, or UPF and SMF, etc.). The node may include one or more processors and one or more memories coupled to the one or more processors. The method may be embodied as a computer program product (e.g. memory) including a non-transitory computer readable medium and instructions stored in the computer readable medium, where the instructions are executable on one or more processors of the node for performing the steps of the method.

Beginning at a start block 922 of FIG. 9B, a cache of stored mappings or associations between application identifiers (or domain names) and server addresses, determined based on UE DNS requests, may be maintained and regularly updated/changed (step 924 of FIG. 9B; step 3 of FIG. 9A). Again, the caches may be caches of server addresses (e.g. based on TTL settings) obtained by the UPF instance from serving DNS requests from UEs. The server addresses may be client subnet location-dependent server addresses. Updates and/or changes of location data associated with the applications from the updated/changed cache data may be regularly sent to the SMF associated with the UPF instance (step 926 of FIG. 9C; steps 5 and 6 of FIG. 9A). The SMF may therefore be configured to select UPF instances based on (regularly) updated information.

Regarding FIGS. 9A-9B, it is understood that location-based DNS results will change as MEC resource locations are added and/or modified, and application assignments to those locations are modified. This will result in modification of the initial, static information known by the SMF. In some implementations, the UPF may be configured to (intelligently) act on cached content, for example, based on or in response to identifying certain information or conditions. The information or conditions may include temporary network conditions, such as updated knowledge of available MEC resources, connectivity changes, etc. Such information or conditions may be locally learnt and/or received as a result of Operations Administration and Maintenance (OAM) actions (e.g. provided via the SMF).

FIG. 10A is a table 1000A which is an example of an MEC selection table according to some implementations of the present disclosure. Such a table 1000A is an illustrative representation of how data may be input, output, determined, and/or stored with use in the techniques described above. In table 1000A, an application identity or profile is indicated as an input in a column 1004 and a UE location is indicated as an input in a column 1006. An MEC location or identification is indicated as an output in a column 1008 and description information is indicated in a column 1010. As indicated, when the application profile is Sales_Cisco and the UE location is 1000_Block_Main_St, then the MEC is determined to be MEC_Downtown. When the application profile is Sales_Cisco and the UE location is 2nd_Avenue, then the MEC is determined to be MEC_West Side. When the application profile is Marketing_Cisco and the UE location is $2^{nd}$_Avenue, then the MEC is determined to be MEC_North Side.

FIG. 10B is a table 1000B which is an example of an UPF and IP pool selection table according to some implementations of the present disclosure. Such a table 1000B is an example of an illustrative representation of how data may be input, output, determined, and/or stored with use in the techniques described above. In table 1000B, an MEC location is indicated as an input in a column 1024 and a UE location is indicated as an input in a column 1026. A UPF instance is indicated as an output in a column 1028 and a pool of IP addresses is indicated as an output in a column 1030. As indicated, when the MEC is MEC_Downtown and the UE location is 1000_Block_Main_St, then the UPF is determined to be MEC_Downtown and its assigned pool of IP addresses is 10.10.200.0/24. When the MEC is MEC_West Side and the UE location is $2^{nd}$_Avenue, then the UPF is determined to be UPF_North Shore Downtown and its assigned pool of IP addresses is 10.10.100.0/24. When the MEC is MEC_North Side and the UE location is $2^{nd}$_Avenue, then the UPF is determined to be UPF_North Shore Downtown and its assigned pool of IP addresses is 10.10.101.0/24.

Thus, methods and apparatus for use in selecting (e.g. mobile) network resources for UE sessions based on locations of MEC resources and applications of interest have been described. In one illustrative example, a mobility node (e.g. an SMF) may receive a message which indicates a request for creating a session for a user equipment (UE). A user plane function (UPF) instance for the session may be selected based on a set of parameters. The set of parameters may include one or more location(s) of one or more multi-access edge computing (MEC) resources and applications of interest for the UE. Location data associated with the MEC resources and applications may be derived, provisioned or otherwise determined from server addresses obtained from UPF processing of domain name server (DNS) queries associated with the applications. The server addresses or location data derived therefrom may be regularly submitted to the SMF for improved UPF selection based on locations of MEC resources and applications. In preferred implementations, the server addresses are client subnet location-dependent server addresses obtained from client subnet-based DNS queries.

Implementations of the present disclosure have been shown in the figures to apply to a 5G mobile network; however, implementations may be readily applied to other suitable types mobile networks, such as 4G, Long Term Evolution (LTE) based networks having a control and user plane separation (CUPS) architecture, as one ordinarily skilled in the art will readily appreciate. In 4G/LTE with CUPS, the user plane function may be a gateway—user plane (GW-U). As other examples, the SMF may instead be a GW—control plane (GW-C), the AMF may instead be a mobility management entity (MME), the PCF may instead be a policy and control rules function (PCRF). The SMF and GW-C may be more generally referred to as a CP entity for session management. Other naming conventions may be adopted or realized.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first application could be termed a second application, and similarly, a second application could be termed a first application, without changing the meaning of the description, so long as all occurrences of the "first application" are renamed consistently and all occurrences of the "second application" are renamed consistently. The first application and the second application are both applications, but they are not the same application.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at one or more mobility nodes for use in a mobile network,
receiving a message which indicates a request for establishing a session for a user equipment (UE); and
selecting a user plane function instance for the session based on a set of parameters, the set of parameters including one or more locations of one or more multi-access edge computing (MEC) resources and applications of interest for the UE,
wherein a location of an MEC resource and application of interest is determined from a server address obtained from a domain name server (DNS) query that is processed by a user plane function.

2. The method of claim 1, wherein the server address comprises a client subnet location-dependent server address obtained from a client subnet-based DNS query.

3. The method of claim 2, wherein the client subnet-based DNS query is based on Request for Comments (RFC) 7871.

4. The method of claim 1, further comprising:
receiving from the user plane function the server address or location data determined from the server address.

5. The method of claim 1, wherein the set of parameters include a location of the UE.

6. The method of claim 1, wherein the set of parameters include a capacity of the MEC resource.

7. The method of claim 1, wherein the set of parameters include a plurality of locations associated with a set of applications for the UE, the set of applications including one of:
a subset of applications that are locally-configured for the UE,
a subset of applications that are identified from a top website list, or
a subset of applications of one or more application service providers (ASPs) of a service provider (SP) or SP-managed applications.

8. The method of claim 1, wherein the set of parameters include one or more locations of one or more applications in actual or frequent use by the UE.

9. The method of claim 1, which is performed by the one or more mobility nodes comprising a control plane (CP) for session management or session management function (SMF).

10. The method of claim 1, which is performed by a mobility node comprising a session management function (SMF) together with a network function (NF) repository function (NRF).

11. The method of claim 1, wherein the user plane function comprises a gateway-user plane (GW-U).

12. A session management function (SMF) node comprising:
one or more processors configured to:
receive a message which indicates a request for establishing a session for a user equipment (UE); and select a user plane function instance for the session based on a set of parameters, the set of parameters including one or more locations of one or more multi-access edge computing (MEC) resources and applications of interest for the UE, wherein a location of an MEC resource and application of interest is determined from a server address obtained from a domain name server (DNS) query that is processed via a user plane function.

13. The SMF node of claim 12, wherein the server address comprises a client subnet location-dependent server address obtained from a client subnet-based DNS query.

14. The SMF node of claim 13, wherein the client subnet-based DNS query is based on Request for Comments (RFC) 7871.

15. The SMF node of claim 13, wherein the set of parameters include a plurality of locations associated with a plurality of applications of interest for the UE.

16. A method comprising:
at a user plane function (UPF) for use in a mobile network,
receiving from a user equipment (UE) a message which indicates a domain name server (DNS) request for obtaining an address of a server associated with a multi-access edge computing (MEC) application;
sending to an address resolution server a message which indicates a corresponding DNS request, the corresponding DNS request including a client subnet of the UE;
receiving, from the address resolution server as a DNS response, a message which includes a client subnet location-dependent server address associated with the MEC application;
sending, to the UE as a DNS response, a message which includes the client subnet location-dependent server address;
caching a stored mapping or association between an identifier of the MEC application and the client subnet location-dependent server address for processing subsequent DNS requests from the UE or other UEs; and
sending, to a control plane (CP) entity for session management, the client subnet location-dependent server address or location data determined from the client subnet location-dependent server address, for use by the CP for session management in selecting UPF instances for UE sessions based on location of the MEC application.

17. The method of claim 16, wherein the corresponding DNS request and the DNS response are based on Request for Comments (RFC) 7871.

18. The method of claim 16, wherein the CP entity for session management comprises a session management function (SMF), the method further comprising:
repeating the steps of the method for each one of a plurality of DNS requests associated with different MEC applications of interest.

19. The method of claim 16, further comprising:
regularly providing updates to the CP entity for session management based on updates to the stored mapping or association.

20. The method of claim 16, further comprising:
receiving, from the same or other UE, a message which indicates a DNS request for obtaining an address of a server associated with the application;
consulting a cache for the stored mapping or association between the identifier of the application and the client subnet location-dependent server address;
if the stored mapping or association is identified as cached, sending to the UE as a DNS response a message which includes the client subnet location-dependent server address obtained in the cache; and
if the stored mapping or association is not identified as cached, sending to the address resolution server a message which indicates a corresponding DNS request, the corresponding DNS request including a client subnet of the UE.

* * * * *